(No Model.)
J. DIXEY.
STOCK CAR.
No. 279,358. Patented June 12, 1883.
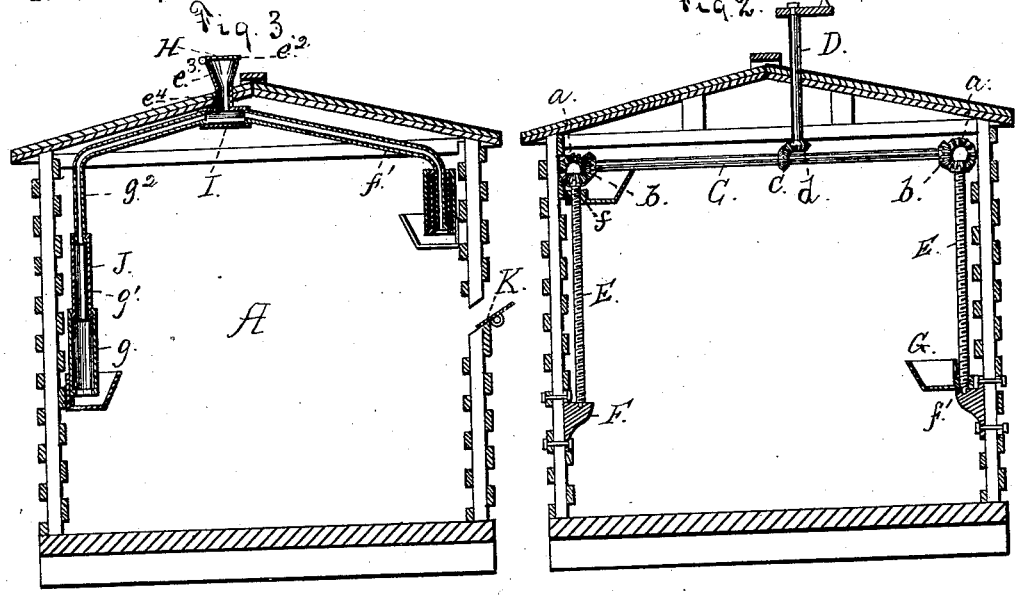
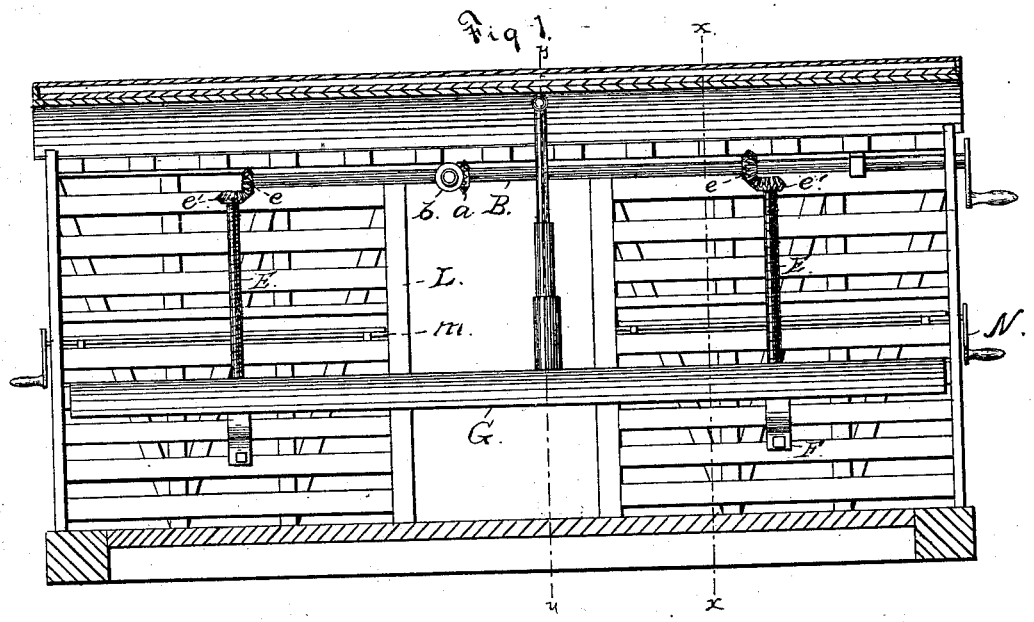
Attest.
N. V. Clark
Geo H. Cooper Jr
Inventor.
John Dixey
By Geo. W. Dyer.
Atty

UNITED STATES PATENT OFFICE.

JOHN DIXEY, OF MICHIGAN CITY, INDIANA.

STOCK-CAR.

SPECIFICATION forming part of Letters Patent No. 279,358, dated June 12, 1883.

Application filed April 16, 1883. (No model.)

*To all whom it may concern:*

Be it known that I, JOHN DIXEY, of Michigan City, in the county of La Porte and State of Indiana, have invented a new and useful Improvement in Stock-Cars; and I do hereby declare that the following is a full and exact description of the same, reference being had to the accompanying drawings, and to the letters of reference marked thereon.

My invention relates to an improvement in stock-cars. The object it has in view is, first, to provide means whereby the water-troughs with which such cars are provided may be conveniently raised to points near the roof of the car when not in use, thus removing all obstructions in the cars and greatly increasing the space to be occupied by the stock; second, to provide convenient means for supplying water to these troughs; and, third, to so construct and arrange the feeding-tables of stock-cars that they may be easily manipulated and will not be in the way when not in use.

To the accomplishment of the above the invention consists, first, of two horizontal shafts, arranged one upon each side of the car, and suitably supported near the roof of the same. These shafts extend nearly the entire length of the car, and at or about the center of each there is mounted a gear-wheel, these wheels meshing with similar wheels mounted one upon each end of a second horizontal shaft extending across the car, about the center of the same, and supported near the roof, as are the two shafts previously referred to. This last-named shaft is provided with a third gear-wheel, which meshes with a similar wheel mounted upon the lower end of a short vertical shaft which passes up through the roof of the car, and which is provided on its upper end with a wheel or crank for operating it, this crank being conveniently located to be operated by the brakeman. The two horizontal shafts, described as situated one on each side of the car and extending nearly its entire length, are each provided with two or more gear-wheels in addition to the ones before mentioned, these last-named wheels meshing with gears mounted on the upper ends of vertical shafts, now to be referred to. These vertical shafts, which are situated on each side of the car, extend from a point near the roof of the same down to suitable brackets or supports secured to the side of said car, in which supports they have their bearings. They are screw-threaded, and are passed through screw-threaded nuts secured to the rear side of the water-troughs. Any number of these screw-threaded rods and nuts may be employed, it only being necessary that a sufficient number be used to insure a steady motion of the water-troughs when they are raised and lowered. When the brakeman operates the short vertical shaft described as passing up through the roof of the car, the water-troughs are raised or lowered on the vertical screw-threaded shafts through the medium of the several gear-wheels referred to.

The second part of the invention consists of a water-tank situated at any convenient point on the roof of the car and filled from any convenient hydrant or pump. This tank is provided with a spout or pipe, which passes through the roof of the car and opens into an air-chamber situated within the car and at a point near the roof of the same, said chamber having outlets through horizontal water-pipes supported near the roof of the car and connecting with suitable vertical water-pipes. These vertical pipes are flat telescopic pipes, and when extended their full length reach within a short distance of the bottom of the water-troughs when said troughs are lowered as far as possible. They are situated directly in a line with the water-troughs, and the lower section of each is secured in any desired manner to the inside of said trough. Thus these pipes are extended or contracted according as the troughs are lowered or raised, the top section of each pipe being sufficiently short to allow of the troughs being raised as high as desired.

The third part of the invention consists of a feeding-table composed of a flat metal strip of sufficient width, which is arranged on the side of the car, and extends from the end of the car to the door of the same. This table is securely fastened to a rod or shaft which extends from the end of the car to the door of the same, and which is provided ot one end with a crank or other suitable means for revolving it. When not in use this table rests in a vertical position against the exterior of the car, and when it is desired to feed the stock the crank at the end of the car is turned and the table caused to occupy a slightly inclined position, with about half of its surface extending between the slats of which the side of the car is formed and the other half protruding out from the car, there being preferably two of these tables on each side of the car.

For the better understanding of the invention, and in order that those skilled in the art to which it pertains may make and use the same, reference will be made to the accompanying drawings, which form part of this specification, and in which—

Figure 1 is a section of a car, showing part of my invention, and also showing certain modifications of the same; Fig. 2, a vertical section taken on line $x\,x$, Fig. 1, and Fig. 3 a similar view taken on line $y\,y$, Fig. 1.

Like letters refer to corresponding parts in the several views.

In the drawings, A represents a stock-car of ordinary construction. Upon each side of this car, and at points near the roof of the same, are supported the horizontal shafts B, said shafts extending nearly the entire length of the car, and having any suitable bearings. Near the center of each of these shafts there is mounted a gear-wheel, $a$, said wheels meshing with similar wheels, $b$, mounted one upon each end of a second horizontal shaft, C, said last-named shaft being also provided with a third gear-wheel, $c$, which meshes with a gear, $d$, mounted upon the lower end of a short vertical shaft, D, which extends up through the roof of the car, and is provided on its upper end with a crank or wheel, $d'$, by means of which said shaft D is revolved, and with it, through the medium of gear $d$, $c$, $b$, and $a$, the shafts B and C. The crank $d'$, attached to the upper end of shaft D, is within easy reach of the brakeman, and may be operated by him.

Upon each of the horizontal shafts B, and at the points shown in Fig. 1, are mounted two or more gear-wheels, $e$, which, upon the revolution of said shafts B, mesh with gear $e'$, mounted upon the upper end of vertical shafts E, thus imparting motion to said shafts E. These vertical shafts are screw-threaded, and extend from points near the roof of the car down to suitable brackets or supports, F, in which they have bearings. They are, as shown, situated upon the sides of the car, and preferably one at or about each end of the water-troughs G, to be referred to. The brackets F, in which these shafts have their bearings, are secured to the sides of the car at a suitable distance above the floor of the same.

The water-troughs above referred to are composed of any suitable material, and are of any desired shape, their length being determined by the length of the car in which they are used. To the rear side of each of these troughs are secured two or more screw-threaded nuts, $f$, the number to be determined by the number of the screw-threaded shafts E employed. These shafts E are passed through the nuts thus secured to the troughs, and upon the revolution of said shafts (through the medium of gear and shafts referred to) the troughs are raised or lowered.

In Fig. 1 of the drawings I have illustrated a construction which is a modification of that thus far described. This modification consists in doing away with the short vertical shaft D and its attachments, and in extending one of the horizontal shafts B through the end of the car and attaching a crank or wheel thereto for the purpose of revolving said shaft, together with the other shafts described, and thus raising and lowering the troughs.

Situated upon the roof of the car is a water-tank, H, provided with a suitable lid or cover, $e^2$, and consisting of a funnel-shaped receptacle, $e^3$, and a discharge-pipe, $e^4$, said discharge-pipe passing through the roof of the car and opening into an air-chamber, I, situated within the car and at a point near the roof of the same. The object of this air-chamber is to prevent the sudden escape of the water from the hydrant or pump into the pipes connecting with the troughs. This chamber is to be between one and two feet in length, about five inches in depth. This air-chamber I is provided upon each side and at points near its bottom with outlets, which open into horizontal water-pipes $f'$, said water-pipes extending across the car and being suitably supported near the roof of the same. At their outer ends they are connected in any suitable manner to vertical water-pipes J, to be hereinafter described. It will be apparent that without departing from the spirit of my invention I may do away with this air-chamber and connect the pipes $f''$ directly to the pipe $e^4$. These pipes J are flat telescopic pipes, consisting of two or more sections, $g\,g'\,g^2$, &c. The different sections are joined together loosely, and provided with any suitable means to prevent their separating. The lower section is secured by means of screws, or in any other suitable manner, to the interior of the water-troughs G. Instead of using the telescopic pipes described, it may be found advantageous to employ pipes formed in sections, said sections being joined together as are the gas-pipes in common use. When this construction is employed the pipes fold up when the troughs are raised, and occupy a position against the inner wall of the car, where they are not in the way. Thus when the stock is to be watered the troughs are lowered, and in their descent carry the pipes J. Water from any convenient hydrant or pump is then pumped into the tank H, the lid $e^2$ being raised for that purpose. This water is discharged through the pipe $e^4$ into chamber I, and then passes through pipes $f'$ and J into troughs G, said troughs being provided with any suitable means for the discharge of any surplus.

In Figs. 1 and 3 I have clearly shown the feeding-table used, and also the manner of operating the same. This table, which is marked K in the drawings, consists of a strip of board or sheet-iron of any desired width, its length being determined by the length of the car on which it is used. There are two of these strips on each side of the car, each of which extends from one of the door-posts (marked L) to the end of the car. Each strip is secured firmly to a shaft, M, said shafts extending slightly beyond the end of the car, and provided with a crank, N. These shafts have suitable bearings on the outside of the car. When the tables K are not in use they occupy a vertical position on the outside of the car, and when it is desired to use them the cranks N are turned, which causes the shafts M to revolve, and with them the tables K, this motion causing said tables to occupy a slightly-inclined position, as shown in Fig. 3. By reference to that figure it will be seen that when in the position last described these tables pass through the slats which form the side of the car, half of said table being within and half without the car.

By means of this construction it will be seen that a convenient table for feeding the stock is provided, which, when not in use, occupies no space within the car. Another advantage of this arrangement is that when desired a portion of the stock may be fed without having the table extend the entire length of the car.

Having thus described my invention, what I claim as new therein, and that for which I desire to secure Letters Patent, is—

1. In a stock-car, a vertically-adjustable water-trough, in combination with a vertical water-supply pipe, made in sections, and operated substantially as described and shown.

2. In a stock-car, the combination of a vertical water-supply pipe, made in sections, a vertically-adjustable water-trough provided with screw-threaded nuts, and two or more vertical screw-threaded shafts, the several parts constructed as shown and operated as described.

3. In a stock-car, the combination of the vertical shaft D, horizontal shafts C B, vertical screw-threaded shafts E, vertical water-supply pipes J, made in sections, and water-troughs G, said troughs provided with screw-threaded nuts, and the several shafts provided with means for operating them, substantially as described, shown, and for the purpose set forth.

4. In a stock-car, the combination of the feed-table K and shaft M, said shaft provided with means for operating it, substantially as described and shown.

In testimony whereof I affix my signature in presence of two witnesses.

JOHN DIXEY.

Witnesses:
 E. G. ROBINSON,
 W. W. PERKINS.